(12) United States Patent
Greco et al.

(10) Patent No.: US 10,884,653 B2
(45) Date of Patent: Jan. 5, 2021

(54) IMPLEMENTING A MAPPING BETWEEN DATA AT A STORAGE DRIVE AND DATA BLOCKS AT A HOST

(71) Applicant: International Business Machines Corporation, Armonk, NY (US)

(72) Inventors: Paul M. Greco, Tucson, AZ (US); Edwin R. Childers, Tucson, AZ (US); Simeon Furrer, Altdorf (CH); Roy D. Cideciyan, Rueschlikon (CH); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/167,286

(22) Filed: Oct. 22, 2018

(65) Prior Publication Data

US 2020/0125289 A1 Apr. 23, 2020

(51) Int. Cl.
*G06F 3/06* (2006.01)

(52) U.S. Cl.
CPC .......... *G06F 3/0655* (2013.01); *G06F 3/0619* (2013.01); *G06F 3/0682* (2013.01)

(58) Field of Classification Search
CPC .......... G06F 12/0607; G06F 15/17375; G06F 3/064; G06F 16/283; G06F 12/0207; G06F 3/0619; G06F 3/0683; G06F 3/0688; G06F 12/10; G06F 3/0655; G06F 3/0682; G06F 11/0793; G06F 3/0653; G06F 11/0727; G06F 3/011; G06F 3/061; G06F 3/0611; G06F 3/0634; G06F 3/0659; G06F 3/0674; G06F 3/0685; G06T 19/006

See application file for complete search history.

(56) References Cited

U.S. PATENT DOCUMENTS

| | | | |
|---|---|---|---|
| 6,425,042 B1 | 7/2002 | Ikeda et al. | |
| 7,539,824 B2 | 5/2009 | Lolayekar et al. | |
| 7,876,516 B2 | 1/2011 | Cideciyan et al. | |
| 8,046,489 B2 | 10/2011 | Blom et al. | |
| 8,281,305 B2 | 10/2012 | Otani | |
| 8,438,138 B2 | 5/2013 | Rathi et al. | |
| 8,514,509 B2 | 8/2013 | Brittner et al. | |
| 8,732,339 B2 | 5/2014 | Shin et al. | |
| 8,762,794 B2 | 6/2014 | Chakradhar et al. | |
| 8,880,980 B1 | 11/2014 | Mathew et al. | |
| 9,405,486 B2 * | 8/2016 | Miller | G06F 3/0619 |
| 9,680,937 B2 | 6/2017 | Golbourn et al. | |
| 9,703,631 B2 | 7/2017 | Earhart | |
| 9,842,156 B2 | 12/2017 | Mesnier et al. | |
| 2002/0156946 A1 | 10/2002 | Masters et al. | |

(Continued)

OTHER PUBLICATIONS

Greco et al., U.S. Appl. No. 16/167,305, filed Oct. 22, 2018.

(Continued)

*Primary Examiner* — Zhuo H Li
(74) *Attorney, Agent, or Firm* — Zilka-Kotab, P.C.

(57) ABSTRACT

A computer-implemented method according to one embodiment includes sending, from a host to a storage drive, a read request for data, receiving, at the host from the storage drive, a portion of the data as fixed-size two-dimensional units, where the fixed-size two-dimensional units are mapped to fixed-size one-dimensional user data blocks located at the host, and performing one or more actions at the host, utilizing the portion of the data.

20 Claims, 10 Drawing Sheets

(56) References Cited

U.S. PATENT DOCUMENTS

| | | |
|---|---|---|
| 2003/0069963 A1 | 4/2003 | Jayant et al. |
| 2006/0010227 A1 | 1/2006 | Atluri |
| 2008/0007856 A1 | 1/2008 | Tango et al. |
| 2012/0151355 A1 | 6/2012 | Butt et al. |
| 2014/0040573 A1 | 2/2014 | Cherkasova et al. |
| 2016/0349997 A1 | 12/2016 | Saliba |
| 2017/0117014 A1* | 4/2017 | Cideciyan ........ G11B 20/10009 |
| 2019/0235765 A1 | 8/2019 | Crawford et al. |
| 2020/0125272 A1 | 4/2020 | Greco et al. |
| 2020/0125277 A1 | 4/2020 | Greco et al. |

OTHER PUBLICATIONS

Greco et al., U.S. Appl. No. 16/167,319, filed Oct. 22, 2018.

List of IBM Patents or Patent Applications Treated As Related.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Dec. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

Seagate Blog, "Nearline HDD: The Cloud Dominates Enterprise Storage Demand," Seagate Blog, 2018, 5 pages, retrieved from https://blog.seagate.com/intelligent/nearline-hdd-the-cloud-dominates-enterprise-storage-demand/.

Coughlin, T., "HDD Growth In Nearline Markets," Forbes, Feb. 5, 2018, 4 pages, retrieved from https://www.forbes.com/sites/tomcoughlin/2018/02/05/hdd-growth-in-nearline-markets.

Brewer, E., "Google seeks new disks for data centers," Google Cloud Platform, Feb. 23, 2016, 3 pages, retrieved from https://cloudplatform.googleblog.com/2016/02/Google-seeks-new-disks-for-data-centers.html.

Anonymous, "Expanded Sub Data Set for Magnetic Tape Recording," IP.com Prior Art Database, Technical Disclosure No. IPCOM000223249D, Nov. 13, 2012, 6 pages.

Anonymous, "Systematic LDPC Encoding with Distributed Parity for Magnetic and Optical Storage Devices," IP.com Prior Art Database, Technical Disclosure No. IPCOM000219465D, Jul. 3, 2012, 6 pages.

IBM, "Tape Indexing Methodology for Long Term Archives," IP.com Prior Art Database, Technical Disclosure No. IPCOM000174460D, Sep. 9, 2008, 9 pages.

Mesnier et al., "Object-Based Storage," IEEE Communications Magazine, Aug. 2003, pp. 84-90.

Non-Final Office Action from U.S. Appl. No. 16/167,305, dated Jun. 12, 2020.

Non-Final Office Action from U.S. Appl. No. 16/167,319, dated Jul. 24, 2020.

Notice of Allowance from U.S. Appl. No. 16/167,305, dated Sep. 30, 2020.

\* cited by examiner

IMPLEMENTING A MAPPING BETWEEN DATA AT A STORAGE DRIVE AND DATA BLOCKS AT A HOST

BACKGROUND

The present invention relates to data storage and retrieval, and more specifically, this invention relates to performing synchronous host data to storage drive format mapping.

State-of-the-art linear magnetic tape drives accept variable size host data "records" and map them to a variable number of fixed logical size datasets (DS) on tape. The physical size of datasets on tape is variable due to rewrites. As a consequence, the boundaries of the variable size host records versus the fixed size logical tape datasets are non-aligned and asynchronous, and therefore retrieval of records from tape is complicated and requires stream parsing. If a DS cannot be retrieved successfully, even records beyond the DS content may be lost.

SUMMARY

A computer-implemented method according to one embodiment includes sending, from a host to a storage drive, a read request for data, receiving, at the host from the storage drive, a portion of the data as fixed-size two-dimensional units, where the fixed-size two-dimensional units are mapped to fixed-size one-dimensional user data blocks located at the host, and performing one or more actions at the host, utilizing the portion of the data.

In one optional embodiment, each of the fixed-size two-dimensional units are aligned and synchronous with the fixed-size one-dimensional user data blocks located at the host.

In another optional embodiment, performing the one or more actions includes performing ECC decoding on each of the fixed-size two-dimensional units, utilizing a mapping between the fixed-size two-dimensional units and the fixed-size one-dimensional user data blocks located at the host.

In this way, boundary alignment and synchronicity may be guaranteed between the fixed-size two-dimensional units located at the storage drive and the fixed-size one-dimensional user data blocks located at the host. Additionally, the host may be able to decode (e.g., ECC decode, etc.) a portion of requested data when the entirety of the requested data is not returned by the storage device in response to the read request. Further, the host may be able to request and successfully access and decode additional data after read errors occur at the storage drive. Further still, the mapping may eliminate a need for performing stream parsing by the host when retrieving records from the storage drive.

According to another embodiment, a computer program product for implementing a mapping between data at a storage drive and data blocks at a host includes a computer readable storage medium that has program instructions embodied therewith, where the computer readable storage medium is not a transitory signal per se, and where the program instructions are executable by a processor to cause the processor to perform a method comprising sending, by the processor from a host to a storage drive, a read request for data, receiving, by the processor at the host from the storage drive, a portion of the data as fixed-size two-dimensional units, where the fixed-size two-dimensional units are mapped to fixed-size one-dimensional user data blocks located at the host, and performing, by the processor, one or more actions at the host, utilizing the portion of the data.

A system according to another embodiment includes a processor, and logic integrated with the processor, executable by the processor, or integrated with and executable by the processor, where the logic is configured to send, from a host to a storage drive, a read request for data, receive, at the host from the storage drive, a portion of the data as fixed-size two-dimensional units, where the fixed-size two-dimensional units are mapped to fixed-size one-dimensional user data blocks located at the host, and perform one or more actions at the host, utilizing the portion of the data.

Other aspects and embodiments of the present invention will become apparent from the following detailed description, which, when taken in conjunction with the drawings, illustrate by way of example the principles of the invention.

DETAILED DESCRIPTION

Figure 1:
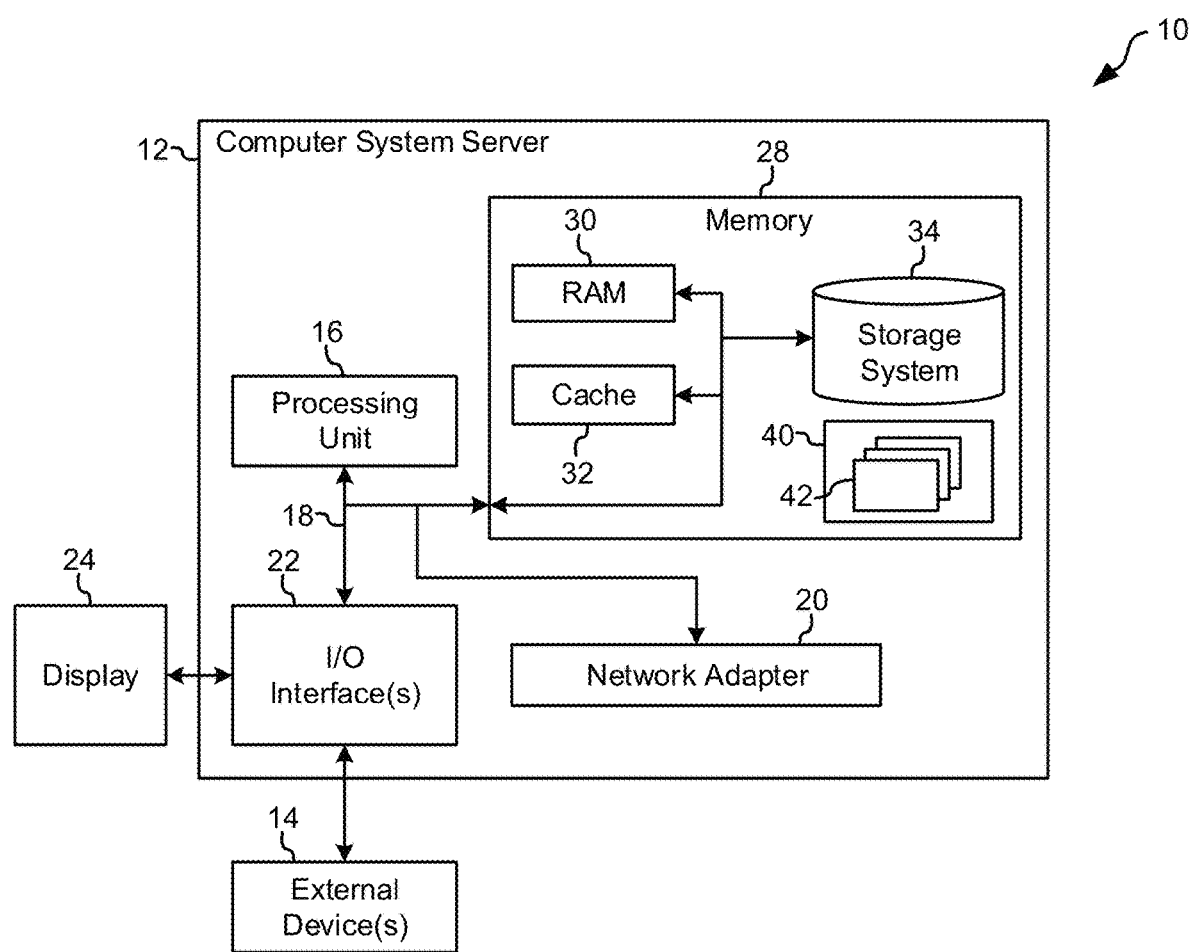
FIG. 1 depicts a cloud computing node according to an embodiment of the present invention.

The following description discloses several preferred embodiments of systems, methods and computer program products for implementing a mapping between data at a storage drive and data blocks at a host. Various embodiments provide a method for performing synchronous host data to tape format mapping in order to perform actions on data at the host.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing a mapping between data at a storage drive and data blocks at a host.

In one general embodiment, a computer-implemented method includes sending, from a host to a storage drive, a read request for data, receiving, at the host from the storage drive, a portion of the data as fixed-size two-dimensional units, where the fixed-size two-dimensional units are mapped to fixed-size one-dimensional user data blocks located at the host, and performing one or more actions at the host, utilizing the portion of the data.

In one optional embodiment, each of the fixed-size two-dimensional units are aligned and synchronous with the fixed-size one-dimensional user data blocks located at the host.

In another optional embodiment, performing the one or more actions includes performing ECC decoding on each of the fixed-size two-dimensional units, utilizing a mapping between the fixed-size two-dimensional units and the fixed-size one-dimensional user data blocks located at the host.

In this way, boundary alignment and synchronicity may be guaranteed between the fixed-size two-dimensional units located at the storage drive and the fixed-size one-dimensional user data blocks located at the host. Additionally, the host may be able to decode (e.g., ECC decode, etc.) a portion of requested data when the entirety of the requested data is not returned by the storage device in response to the read request. Further, the host may be able to request and successfully access and decode additional data after read errors occur at the storage drive. Further still, the mapping may eliminate a need for performing stream parsing by the host when retrieving records from the storage drive.

In another general embodiment, a computer program product for implementing a mapping between data at a storage drive and data blocks at a host includes a computer readable storage medium that has program instructions embodied therewith, where the computer readable storage medium is not a transitory signal per se, and where the program instructions are executable by a processor to cause the processor to perform a method comprising sending, by the processor from a host to a storage drive, a read request for data, receiving, by the processor at the host from the storage drive, a portion of the data as fixed-size two-dimensional units, where the fixed-size two-dimensional units are mapped to fixed-size one-dimensional user data blocks located at the host, and performing, by the processor, one or more actions at the host, utilizing the portion of the data.

In another general embodiment, a system includes a processor, and logic integrated with the processor, executable by the processor, or integrated with and executable by the processor, where the logic is configured to send, from a host to a storage drive, a read request for data, receive, at the host from the storage drive, a portion of the data as fixed-size two-dimensional units, where the fixed-size two-dimensional units are mapped to fixed-size one-dimensional user data blocks located at the host, and perform one or more actions at the host, utilizing the portion of the data.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
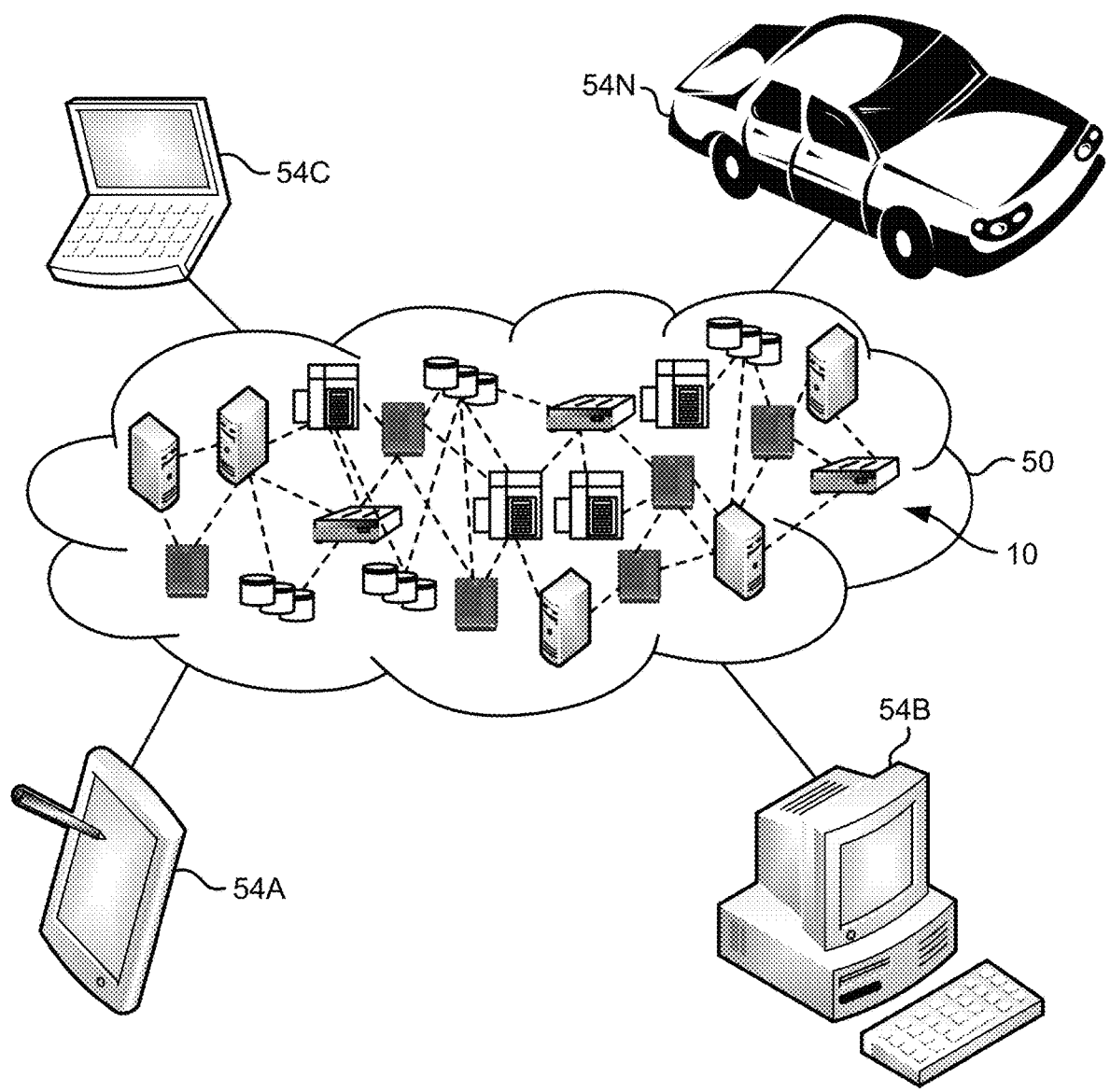
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
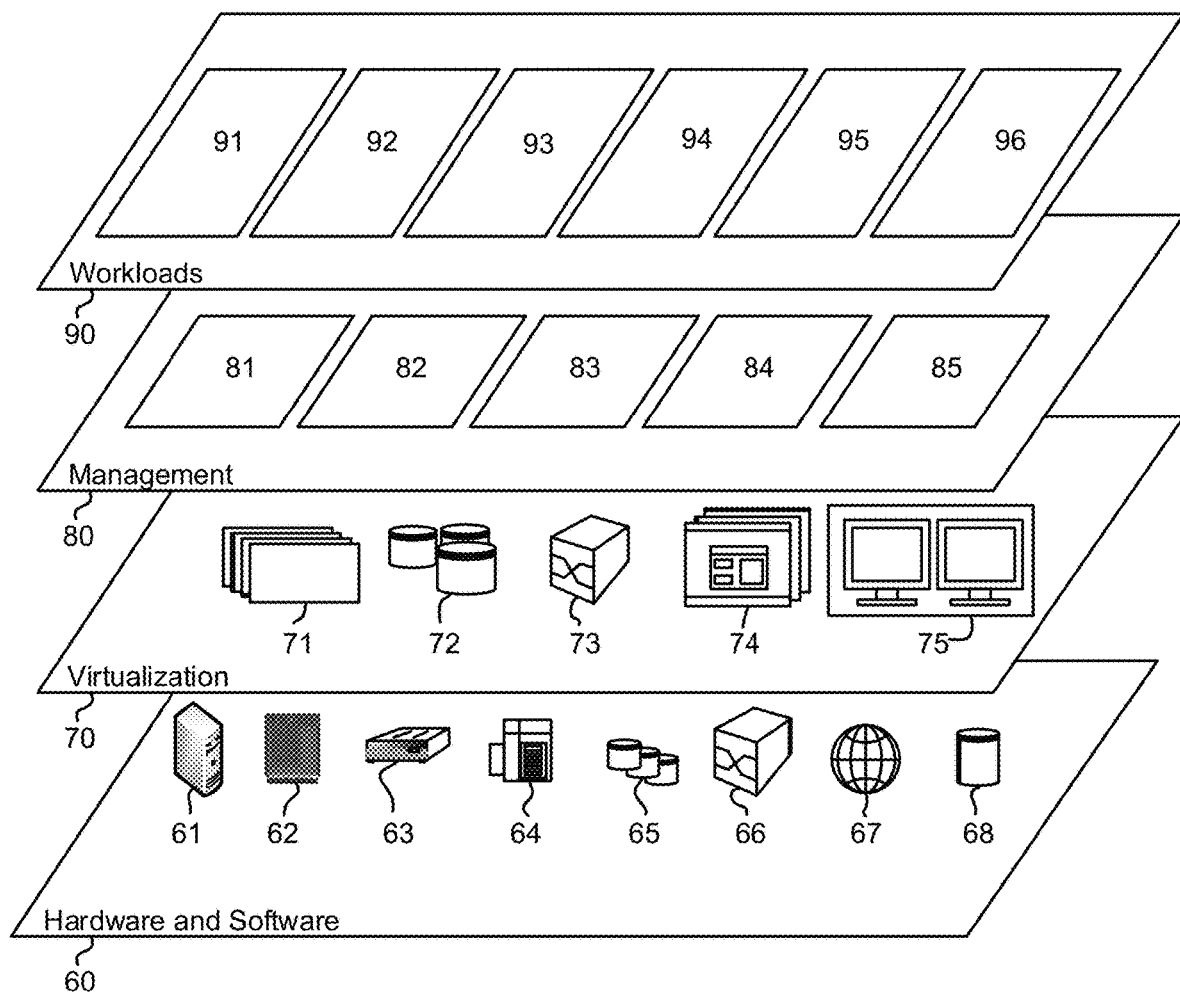
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
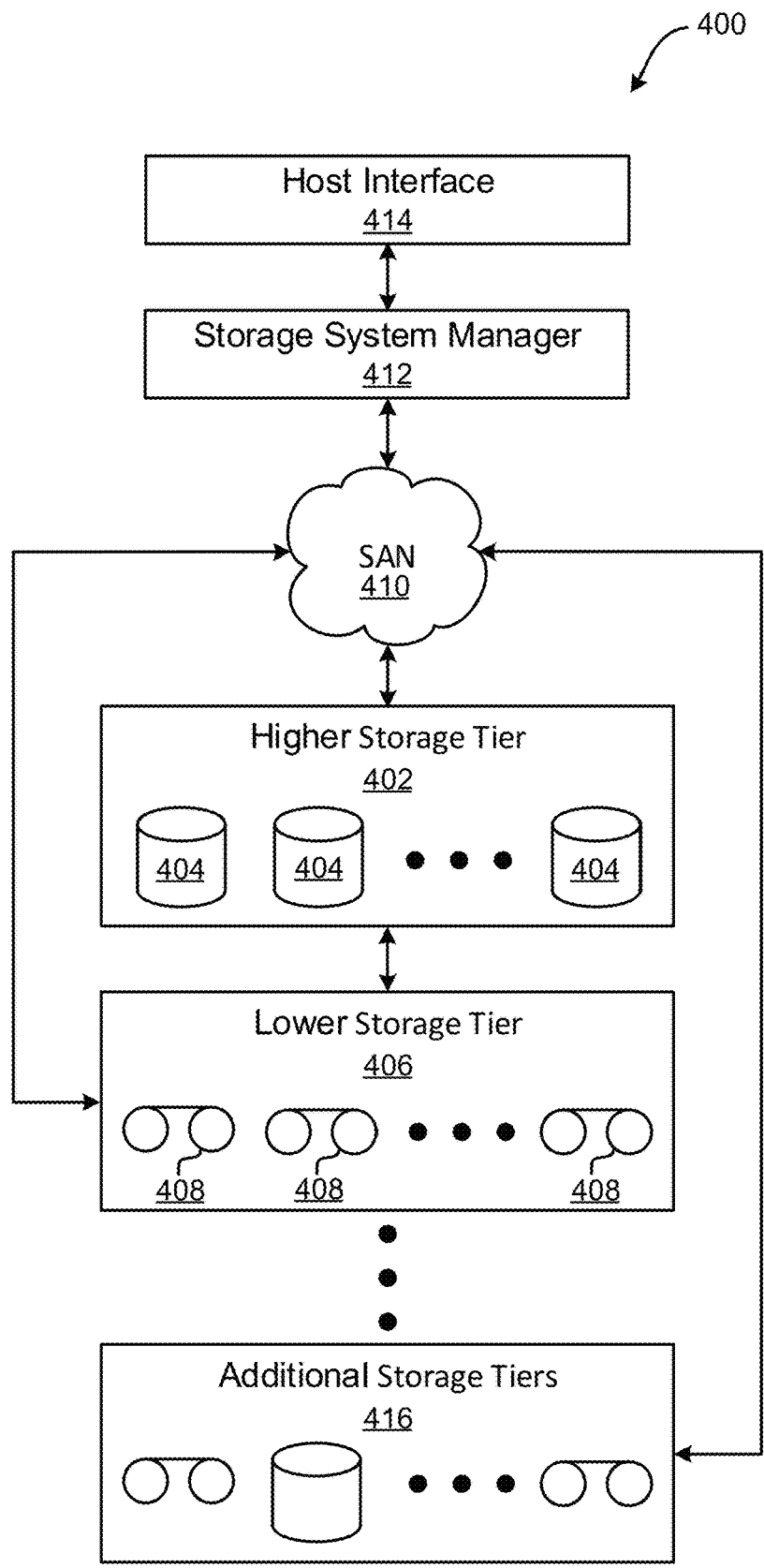
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Storage Drive with Variable Quality of Service (QoS)

Figure 5:
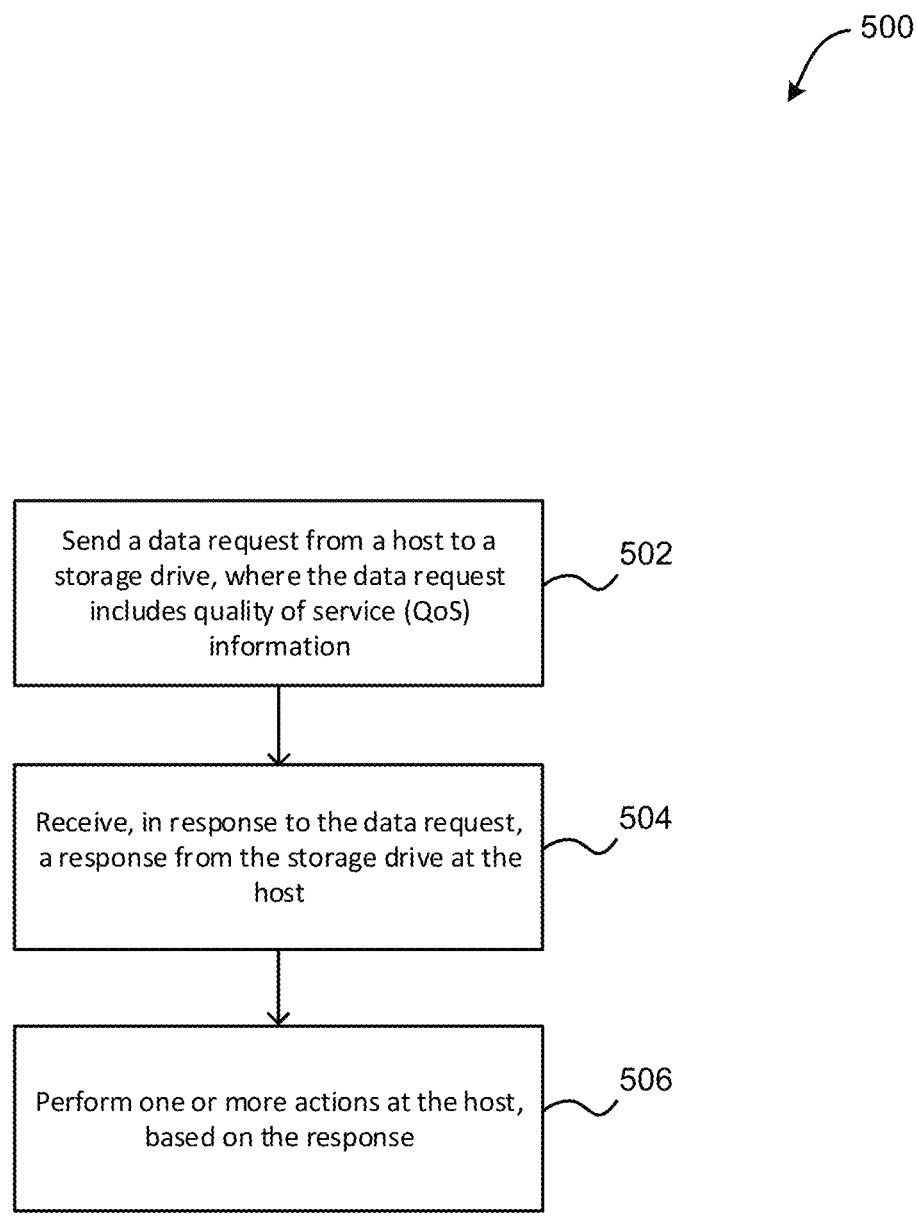
FIG. 5 illustrates a flowchart of a method for implementing a data request with quality of service information at a host, in accordance with one embodiment.

Now referring to FIG. 5, a flowchart of a method 500 for implementing a data request with quality of service information at a host is shown according to one embodiment. The method 500 may be performed in accordance with the present invention in any of the environments depicted in FIGS. 1-4, 7, and 10, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a data request is sent from a host to a storage drive, where the data request includes quality of service (QoS) information. In one embodiment, the host may include a data center. For example, the data request may be sent by one component (e.g., node, server, etc.) of the data center. In another embodiment, the host may include a cloud computing environment. For example, the data request may be sent by one component (e.g., node, server, etc.) of a cloud-based computing environment.

Additionally, in one embodiment, the data request may be sent by the host in response to a request for the data received at the host by an application, a user, etc. In another embodiment, the storage drive may include a drive capable of storing data (e.g., a tape drive, etc.). For example, the storage drive may include a tape drive that reads data from, and writes data to, one or more tape cartridges.

Further, in one embodiment, the data request may include a data read request, a data write request, etc. In another embodiment, the data request may include an indication of the requested action to be performed on the data. In yet another embodiment, the data request may include an identification of the data associated with the request (e.g., an identifier of the data to be written to/read from the storage drive, etc.).

Further still, in one embodiment, the QoS information may be included as a field within the data request. For example, the data request may include a parameter that contains the QoS information. In another example, the data request may be bound to a read/write command sent to the storage drive. In another embodiment, the QoS information may be included as a command separate from the data request. For example, the data request may include multiple commands, including a data request command and a separate QoS command.

Also, in one embodiment, the QoS information may be determined, and included in the data request, by the host. In another embodiment, the QoS information may indicate parameters to be used by the storage drive when reading the requested data from the storage drive. For example, the QoS information may include a maximum number of read retries (e.g. back-hitches in a magnetic tape storage system) that may be attempted by the storage drive when reading the requested data.

In another example, the QoS information may include a maximum latency that may be allowed by the storage drive when reading the requested data. For instance, the maximum latency may indicate how much time should be spent by the storage drive on a data read before status feedback is sent to the host. In yet another example, the QoS information may include a maximum error rate that may be allowed by the storage drive when reading the requested data. In still another example, the QoS information may include a predetermined level of effort to be expended by the storage drive when reading the requested data. For instance, the predetermined level of effort may include a numerical value on a predetermined scale, where each numerical value is associated with a predetermined number of acceptable read retries, a maximum latency amount, a maximum error rate, etc.

In addition, in one embodiment, the QoS information may indicate parameters to be used by the storage drive when writing the requested data to the storage drive. For example, the QoS information may include a minimum write quality to be enabled by the storage drive when writing the data (e.g., utilizing read-while-write functionality of the storage drive, etc.). In another example, the QoS information may include a rewrite threshold and/or condition to be implemented by the storage drive when writing the data. In yet another example, the QoS information may include an amount of error correction code (ECC) protection to be implemented by the storage drive when writing the data.

Furthermore, in one embodiment, the QoS information may include a modal parameter. For example, the QoS information may indicate one of a plurality of predetermined modes (e.g., a streaming mode, a maximum effort mode, etc.) under which the storage drive is to operate. In another example, the modal parameter may indicate a mode under which the storage drive is to implement the data request and/or subsequent data requests with a predetermined QoS. In yet another example, the modal parameter may be implemented by the storage drive for a predetermined time period, until an additional modal parameter is provided, etc.

Further still, in one embodiment, the QoS information may include a request from the host for the storage drive to read the requested data with minimum latency. For example, the QoS information may request that the storage drive retrieve and return data with a maximum data rate and no retries/back hitching, and return data to the host even if there are uncorrectable errors. In another example, the QoS information may also request that the storage drive return pointers to errors in the returned data.

Also, in one embodiment, the QoS information may include a request from the host for the storage drive to read and return data with an intermediate quality of service. For example, the QoS information may request that the storage drive read data at a tape speed that enables iterative decoding and/or more accurate track-following servo control. In another example, the QoS information may request that the storage drive enable a single or predetermined number of retries during data reading, and report a quality of read data (including error pointers if errors are detected).

Additionally, in one embodiment, the QoS information may include a request from the host for the storage drive to implement a maximum effort to read and return data. For example, the QoS information may request that the storage drive use one or more error recovery procedures (ERPs) if required during data reading, and report a quality of read data (including error pointers if errors are detected). For instance, ERPs may include procedures used to retrieve/recover data if a mode of operation fails. In another embodiment, the QoS information may include a request from the host for the storage drive to write with no rewrites and to report quality metrics (e.g., ECC decoding results such as a C1 (Reed-Solomon row code) uncorrectable error rate, a signal-to-noise ratio (SNR), any detected dead tracks, and/or a weighted combination of these metrics) from a read-while-write verification.

Further, in one embodiment, the QoS information may include a request from the host for the storage drive to write the data at a higher linear density (e.g., to achieve increased capacity) and to report quality metrics. In this way, the QoS information sent from the host may indicate a level of effort to be expended by the storage drive while fulfilling the data request.

Further still, method 500 may proceed with operation 504, where in response to the data request, a response is received from the storage drive at the host. In one embodiment, the response may include all or a portion of the requested data read from the storage drive. In another embodiment, the response may also include auxiliary information. In yet another embodiment, the response may include only all or a portion of the requested data read from the storage drive, only the auxiliary information, or both the auxiliary information and all or a portion of the requested data read from the storage drive.

For example, the auxiliary information may indicate an overall success or failure of the data request at the storage drive. In another example, the auxiliary information may generally indicate whether one or more portions of the requested data could not be read at/returned by the storage drive. In yet another example, the auxiliary information may indicate specific portions of the requested data that could not be read/returned (e.g., utilizing erasure pointers, etc.) by the storage drive. In still another example, the auxiliary information may include a summary of the details of the data read performed by the storage drive. For instance, additional details may be available by request. In yet another example, the auxiliary information may include an indication of one or more errors encountered by the storage drive, as well as requested data read by the storage drive subsequent to the one or more errors. In another example, the auxiliary information may include an indication that one or more errors have been encountered by the storage drive.

Also, in one example, the auxiliary information may include a write quality achieved by the storage drive while writing the requested data. In another example, the write quality may include one or more quality metrics obtained during a read-while-write verification performed by the storage drive while writing the data. In yet another example, the auxiliary information may include an indication of one or more errors encountered by the storage drive, as well as a confirmation of requested data written by the storage drive subsequent to the one or more errors.

In another embodiment, the auxiliary information may include all portions of requested data successfully retrieved by the storage drive, as well as an error status indicating one or more portions of the requested data that could not be successfully retrieved by the storage drive. For example, the response may include all portions/blocks of the requested data that was successfully retrieved by the storage drive (e.g., successfully read from tape and ECC decoded, etc.), as well as an error status describing all portions/blocks of the requested data that could not be successfully retrieved by the storage drive (e.g., that were unsuccessfully read and/or unsuccessfully ECC decoded, etc.).

In addition, in one embodiment, the response may include a health status of the storage drive. For example, the health status may include one or more dead tracks identified within the storage drive while performing one or more operations in response to the data request. In another example, the health status may include ECC decoding results, such as e.g. one or more C1/C2 uncorrectable error rates determined by the storage drive while performing one or more operations in response to the data request.

Furthermore, in one example, the health status may include one or more header cyclic redundancy check (CRC) errors determined by the storage drive while performing one or more operations in response to the data request. In another example, the health status may include an SNR determined by the storage drive while performing one or more operations in response to the data request.

Further still, method 500 may proceed with operation 506, where one or more actions are performed at the host, based on the response. In one embodiment, the host may send data returned in response to the data request to one or more applications, one or more users, etc. For example, the data may be sent in response to determining that the response from the storage drive contains all of the requested data.

Also, in one embodiment, the host may perform one or more error correction actions (e.g., ECC decoding, etc.) on the data returned in response to the data request. For example, the one or more error correction actions may be performed in response to determining that the response from the storage drive does not contain all of the requested data, contains one or more errors, etc. In another example, the one or more error correction actions may be performed at a system level, and not at a storage drive level. In yet another example, if the response from the storage drive includes a portion of the requested data, and indicates that one or more portions of the requested data could not be read/returned, the host may perform one or more error corrections actions at a system level in order to obtain all of the requested data. For instance, user data may be encoded using a system level ECC scheme before it is stored on one or more tape cartridges. When the data is (partially) retrieved from tape, the user level ECC may be used to correct for errors or missing chunks of data by means of error correction or erasure correction decoding.

Additionally, in one example, copies (or portions) of the requested data may be stored at one or more other hosts within the system (e.g., the data center, the cloud-based computing environment, etc.), and the host may obtain one or more missing portions of the requested data (or a complete copy of the requested data) from one or more of the other hosts. In another example, the requested data may be stored within the system using erasure coding, which may be used to recover one or more missing portions of the requested data (or a complete copy of the requested data).

Further, in one embodiment, the host may instruct the storage drive to retry the data read/write, in response to determining that the response from the storage drive does not contain all of the requested data, contains one or more errors, etc. For example, the instruction to retry may include the same QoS information included within the original data request. In another example, the instruction to retry may include different QoS information included within the original data request. For example, the different QoS information may include a larger maximum number of read retries, a larger maximum latency, a smaller maximum error rate, a larger predetermined level of effort to be expended by the storage drive when reading the requested data, etc. when compared to the QoS information included within the original data request.

In this way, a communication interface/protocol between the host and the storage drive may be extended to include an amount of effort that the storage drive should exert when managing data reads and writes. The host may then be able to optimize the implementation of data requests in order to balance throughput/latency and error rate/reliability. The host may also increase an available storage capacity at the storage drive by lowering a write quality implemented by the storage drive, while compensating for an increased error rate using system-level error correction. This may improve a performance of the storage drive, since the storage drive may not be responsible for error correction or only responsible for partial error correction, i.e., error correction is performed jointly by the storage drive and system-level error correction (errors that cannot be corrected by the storage drive are corrected by the system-level error correction).

Additionally, the host may request and manage data request retries by the storage drive, and may utilize feedback from the storage drive (such as error pointers, etc.) in system level ECC decoding.

Figure 6:
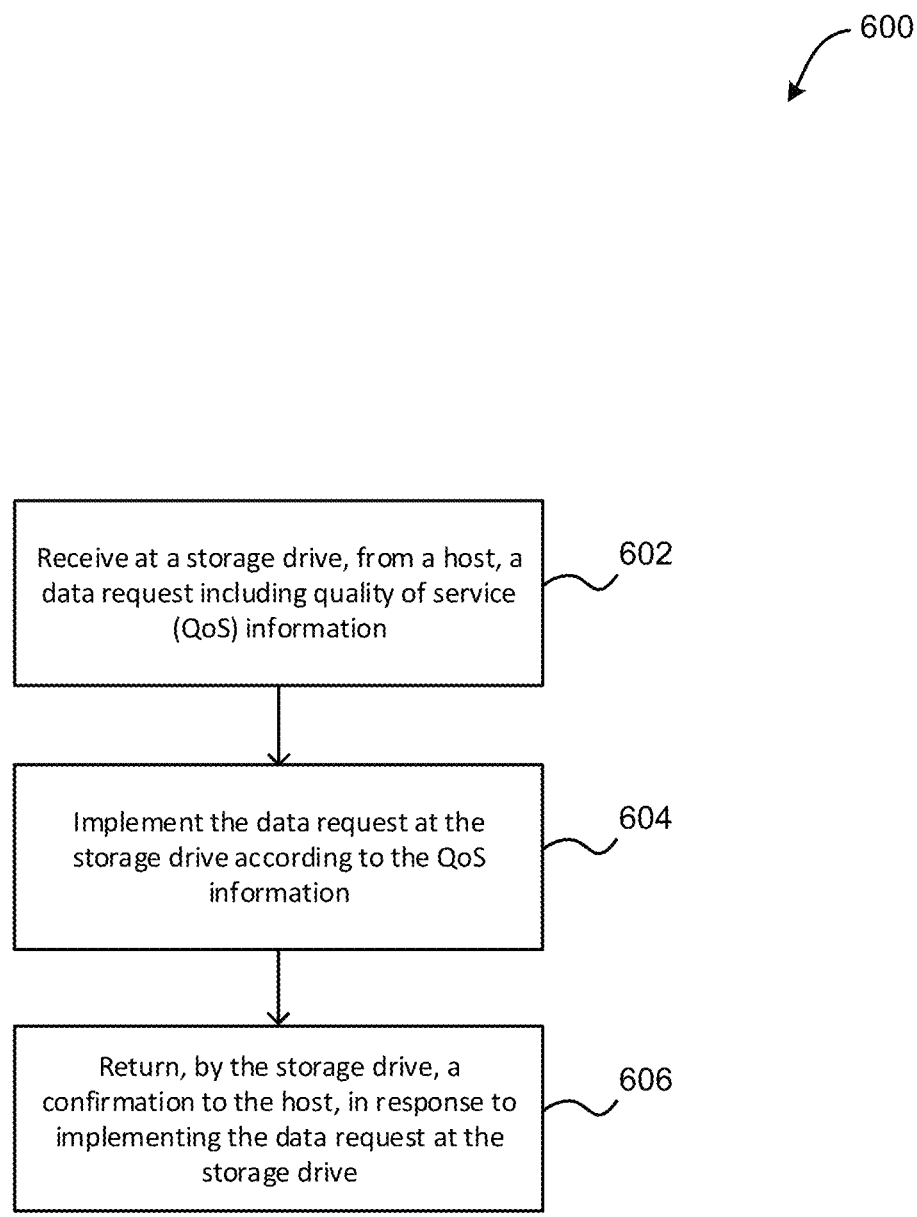
FIG. 6 illustrates a flowchart of a method for implementing a data request with quality of service information at a storage drive, in accordance with one embodiment.

Now referring to FIG. 6, a flowchart of a method 600 for implementing a data request with quality of service information at a storage drive is shown according to one embodiment. The method 600 may be performed in accordance with the present invention in any of the environments depicted in FIGS. 1-4, 7, and 10 among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a data request including quality of service (QoS) information is received at a storage drive from a host. In one embodiment, the data request may include a read request. In another embodiment, the data request may include a write request. In yet another embodiment, the QoS information may be included as a field within the data request, or may be included as a command separate from the data request.

Additionally, in one embodiment, the QoS information may indicate parameters to be used by the storage drive when reading the requested data from the storage drive and/or writing the requested data to the storage drive. In another embodiment, the QoS information may include a modal parameter that indicates one of a plurality of predetermined modes (e.g., a streaming mode, a maximum effort mode, etc.) under which the storage drive is to operate while reading the requested data from the storage drive and/or writing the requested data to the storage drive.

Further, method 600 may proceed with operation 604, where the data request is implemented at the storage drive according to the QoS information. In one embodiment, implementing the data request may include reading the data from a data cartridge (e.g., a tape cartridge, etc.), according to the QoS information. In another embodiment, implementing the data request may include writing the data to a data cartridge (e.g., a tape cartridge, etc.), according to the QoS information.

For example, if the QoS information indicates that the storage drive is to operate in a streaming mode while implementing the data request, the data request may be implemented by the storage drive utilizing the streaming mode. In another example, if the QoS information indicates that the storage drive is to operate utilizing maximum effort while implementing the data request, the data request may be implemented by the storage drive utilizing maximum effort (e.g., utilizing full ECC decoding power at the storage drive, utilizing multiple reads/backhitching, etc.). In yet another example, if the QoS information indicates that the storage drive is to operate in a streaming mode utilizing one or more predetermined parameters, the data request may be implemented by the storage drive utilizing the one or more predetermined parameters.

Further still, method 600 may proceed with operation 606, where a confirmation is returned by the storage drive to the host, in response to implementing the data request at the storage drive. In one embodiment, the confirmation may include all or a portion of the data requested to be read. In another embodiment, the confirmation may include one or more identifiers for portions of data that could not be read successfully. In yet another embodiment, the confirmation may include a summary of the results of implementing the data request at the storage drive according to the QoS information.

Figure 7:
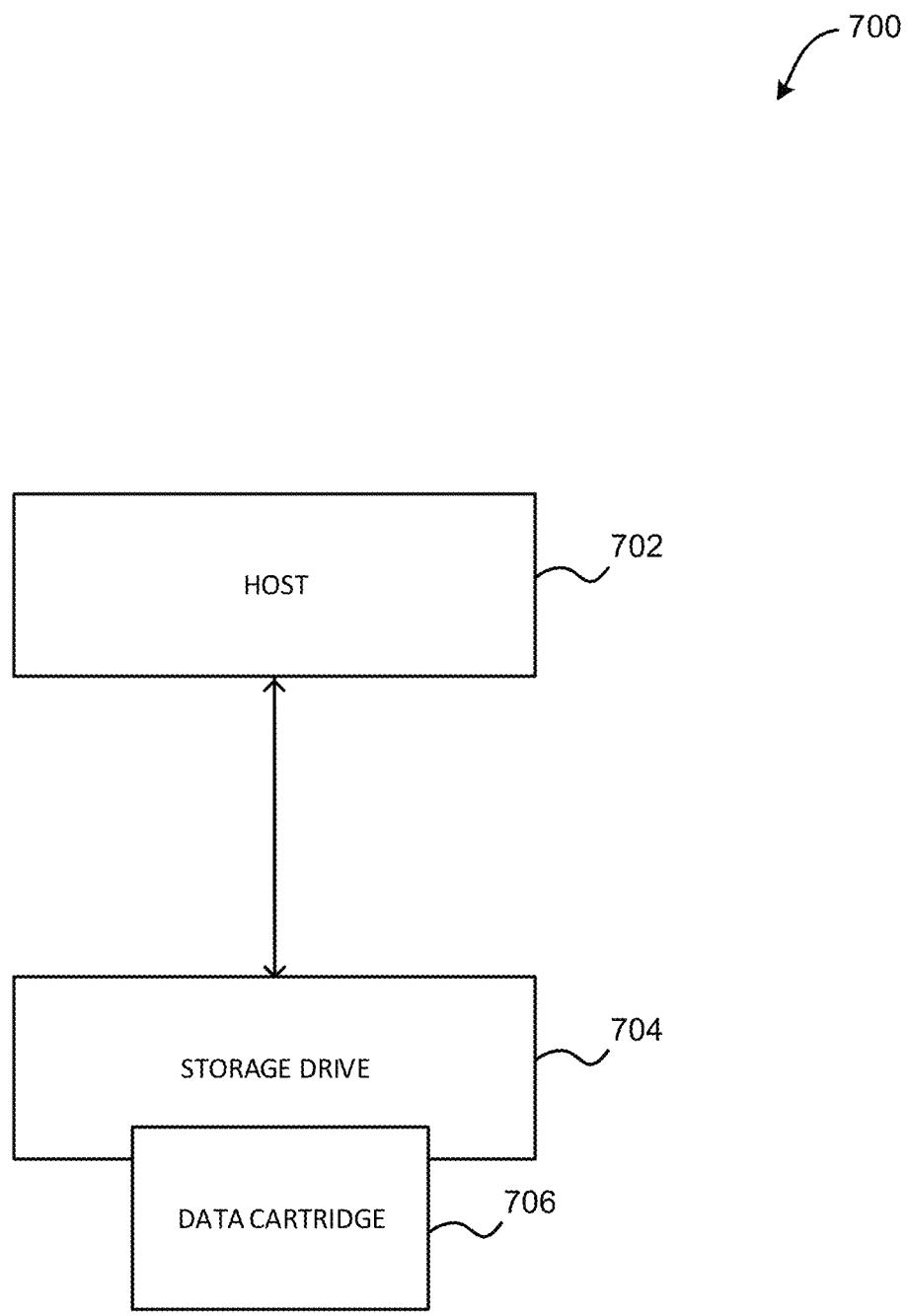
FIG. 7 illustrates an exemplary quality of service (QoS)-centric data management environment, in accordance with one embodiment.

FIG. 7 illustrates an exemplary quality of service (QoS)-centric data management environment 700, according to one exemplary embodiment. As shown, a host 702 is in communication with a storage drive 704. In one embodiment, the host sends a data request including a quality of service (QoS) information to the storage drive 704. For example, the host 702 may send a data write request to the storage drive 704, where the data write request includes an identifier of the data to be written to a data cartridge 706 of the storage drive 704, as well as the QoS information. One example of such a data write request is "WtReq(id, data, QoS)."

Additionally, in another example, the host 702 may send a data read request to the storage drive 704, where the data read request includes an identifier of the data to be read from the data cartridge 706 of the storage drive 704, as well as the QoS information. One example of such a data read request is "RdReq(id, QoS)."

Further, in one embodiment, the storage drive 704 implements the data request received from the host 702, according to the QoS information associated with the request. For example, the storage drive 704 may write data to the data cartridge 706 or read data from the data cartridge 706, according to one or more parameters associated with the QoS information.

Further still, in one embodiment, the storage drive 704 returns results of the implemented data request to the host 702. In another embodiment, the results of the implemented data request may include auxiliary information. If the data request was a read request, the results may include an identifier of the data read by the storage drive 704 from the data cartridge 706, as well as the data itself. For example, the results for a data read may include "RdResp(id, data, aux)."

Also, in one embodiment, if the data request was a write request, the results may include an identifier of the data written by the storage drive 704 to the data cartridge 706. For example, the results for a data write may include "WtResp(id, aux)."

In addition, in one embodiment, in response to a read request, the storage drive 704 may only return a portion of the requested data from the data cartridge 706 to the host 702. For example, the host 702 may send a read request for predetermined data to the storage drive 704, where the read request indicates that the storage drive 704 read data from the data cartridge 706 utilizing a streaming/limited effort mode.

In response to the read request, the storage drive 704 may read data from the data cartridge 706 utilizing the streaming/limited effort mode, which may result in only a portion of the predetermined data being correctly read from the data cartridge 706. The storage drive 704 may then return a response including the portion of the predetermined data that was correctly read, as well as one or more identifiers of portions of the predetermined data that could not be read successfully, to the host 702. For example, the portion of the predetermined data that was correctly read, as well as one or more identifiers of portions of the predetermined data that could not be read successfully, may be included in an "aux" field of the response.

In response to receiving the response, the host 702 may perform one or more error correction actions at the host/system level, instead of the storage drive 704 level, utilizing the correctly read portion of the predetermined data in order to recover the portions of the predetermined data that were not successfully read by the storage drive 704. In one embodiment, the host 702 may use a synchronous mapping that guarantees boundary alignment and synchronicity between a host data format used at the host 702 and a logical format used at the storage drive 704.

In this way, the host 702 may control a manner in which the storage drive 704 reads/writes data from/to the data cartridge 706 during a data request. The host 702 may also offload error correction (or parts of error correction) from the storage drive 704 to the host 702. This may reduce an amount of processing performed by the storage drive 704, which may improve a performance of the storage drive 704. This may also reduce an amount of time taken by the storage drive 704 to return results to the host 702, since only part of the time-intensive error correction may be performed at the storage drive 704.

Cloud-based storage is on the rise, with nearline HDDs as a mainstay for inexpensive, reliable bulk storage. Tape storage devices are known for extremely reliable data protection and long-term retention. To make tape storage even more attractive and suitable for cloud storage and data centers, a variable QoS may be implemented in association with their usage.

State-of-the art tape storage is extremely reliable and offers user error rates of 1e-19 or better by means of in-drive error correction codes (ECC). When data is written, the density of data written may be lower than otherwise possible to preserve the high level of user error rate. Likewise, when data is difficult to retrieve from tape, current tape drives apply large/maximum effort and therefore use excessive amounts of time to recover the data.

Although this is very important from a single host/server perspective, in a data center/cloud environment, storage durability and robustness may be achieved on the system level by spreading data over multiple cartridges/locations and/or by using system level ECC in addition to ECC used in the storage device.

From a system level perspective, a tape drive with higher user error rates (or lower reliability) may be acceptable, particularly if this can be traded off for some other system benefit. If system level ECC is used, a tape drive may be allowed to return user data where some chunks of data are marked as "could not be retrieved" or "not error-free." Further, host-to-drive requests may finish fast (e.g., as fast as possible), even if partially incomplete, so that the system request rate and storage performance may remain high.

A tape drive may be implemented that enables a joint optimization of storage performance, latency, durability, robustness, and reliability between the tape drive(s) and the cloud storage system.

By introducing an extended host-drive communication interface that enables requests with variable quality-of-service, the storage system can achieve improved performance and increased storage capacity, while maintaining a very high level of data robustness and durability. This may in turn reduce the total cost of ownership.

The QoS parameters may be either bound to the (read/write) commands, or may be modal (e.g., the QoS parameters may set the tape drive into a mode that provides a defined QoS for all subsequent commands).

The host-drive communication may be extended with QoS information:
- For read/write requests (host-to-drive), a QoS field (or separate command) may be added to indicate the effort requested in writing data to/retrieving data from tape. The tape drive writes/retrieves data based on requested QoS info.
- A read response (from drive to host) returns retrieved data and auxiliary information pointing out if (and which) data chunks could not be retrieved (e.g., utilizing erasure pointers, etc.) and optionally other quality metrics. Returned auxiliary information may be limited (e.g., utilizing a summary, etc.) with detailed information available via another method.
- A write response (from drive to host) returns information providing information on a write quality achieved by the drive (e.g., utilizing quality metrics from a read-while-write verification, etc.).

The QoS parameters for read requests may include one or more of:
- A maximum number of read retries (back-hitches) or a maximum acceptable latency to be implemented by the drive
- A maximum acceptable error rate to be implemented by the drive
- An overall level of effort to be expended by the drive QoS parameters for write requests may include one or more of:
- A minimum write quality (e.g., read-while-write SNR, bit-error rate (BER), etc.)
- A rewrite threshold/condition
- An amount of ECC protection In one embodiment, drive feedback may be returned to a host highlighting a quality of service achieved and/or health status of the drive (e.g., one or more dead tracks, C1/C2 error rates, SNR, header CRC errors, etc.).

Implementing variable QoS may enable new features/benefits from the host/system's perspective. For example, a host may define a QoS/effort level in data retrieval and data write. In another example, a host may optimize for throughput/latency vs. error-rate/reliability. In yet another example, a host may trade off storage capacity vs. error rate. In still another example, a host may request/manage retries. In another example, drive feedback (e.g. error pointers) may be used in system level ECC decoding.

Implementing variable QoS may allow for a plurality of advantages from the tape storage perspective. For example, variable QoS may enable a reduction of tape total cost of ownership (TCO) and an increased tape capacity by reducing a robustness/reliability within the tape (which may be handled/corrected by ECC at a higher non-tape drive level in the system). Additionally, variable QoS may improve a throughput and a latency of the drive by reducing or completely avoiding back-hitches (e.g., via a best effort read).

Further, a reduction/elimination of rewrites via variable QoS may gain storage capacity (e.g., via a best effort write). Variable QoS also avoids issues with header errors on readback of rewritten data, but still exploits very powerful C 1/C2 iterative decoding (e.g., via a best effort read). Further still, variable QoS may enable an adjustable rewrite threshold/condition (that is QoS based). Variable QoS may also increase a linear density/track-density of a tape cartridge, and may reduce an SNR operating point (e.g., when multiple physical/logical formats are in a single cartridge, etc.). Also, an ECC power/overhead may be increased/decreased as desired by means of selecting a stronger/weaker ECC scheme.

Streaming Mode/"Limited Effort" Tape Drive

Figure 8:
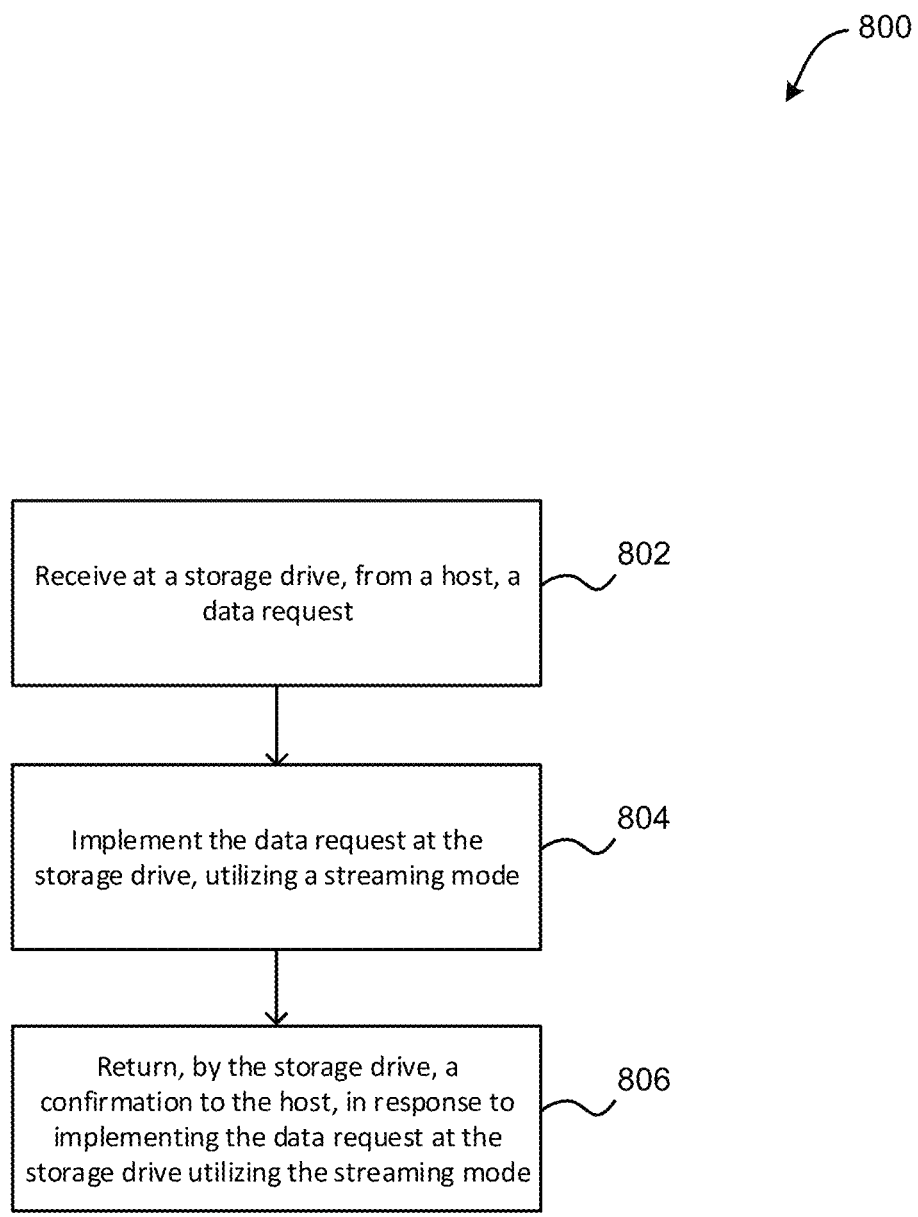
FIG. 8 illustrates a flowchart of a method for implementing a storage drive utilizing a streaming mode, in accordance with one embodiment.

Now referring to FIG. 8, a flowchart of a method 800 for implementing a storage drive utilizing a streaming mode is shown according to one embodiment. The method 800 may be performed in accordance with the present invention in any of the environments depicted in FIGS. 1-4, 7, and 10 among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a data request is received at a storage drive from a host. In one embodiment, the storage drive may include a tape drive. In another embodiment, the data request may include a data read request, a data write request, etc. In yet another embodiment, the data request may include quality of service (QoS) information.

For example, the QoS information may include modal information (e.g., one or more modal parameters, etc.) that indicates that the storage drive is to implement a streaming mode when implementing the data request. In another example, the QoS information may include one or more parameters associated with the performance of a streaming mode by the storage drive.

Additionally, method 800 may proceed with operation 804, where the data request is implemented at the storage drive, utilizing a streaming mode. In one embodiment, the data request may be implemented utilizing the streaming mode in response to QoS information associated with the data request. For example, the QoS information may indicate that the data request is to be implemented utilizing the streaming mode of the storage drive.

Further, in one embodiment, the data request may be implemented utilizing the streaming mode in response to a selection of a setting for the storage drive. In another embodiment, implementing the data request may include reading the data from a data cartridge (e.g., a tape cartridge, etc.), utilizing the streaming mode. For example, implementing a data read at the storage drive utilizing the streaming mode may include identifying a location on a data cartridge where the requested data is located. In another example, implementing a data read at the storage drive utilizing the streaming mode may include reading requested data in a single attempt at a specified speed (e.g., output speed, read speed, etc.), without performing any stopping and/or back-hitching.

Further still, in one example, implementing a data read at the storage drive utilizing the streaming mode may include continuing a reading of the data from the data cartridge at a predetermined rate/speed in response to determining one or more errors during the reading of the data from the data cartridge. In another example, implementing a data read at the storage drive utilizing the streaming mode may include applying advanced data detection at the storage drive during a reading of the data.

Also, in one embodiment, a limited effort reliability may be implemented by the storage drive during the implementation of the data request utilizing the streaming mode. For example, implementing the data read may include obtaining and returning all or a portion of the requested data within a predetermined latency threshold. In another example, implementing a data read at the storage drive utilizing the streaming mode may include implementing iterative ECC decoding during a reading of the data, according to the predetermined latency threshold. In yet another example, implementing a data read at the storage drive utilizing the streaming mode may include returning results of the data read, according to the predetermined latency threshold.

In addition, in one embodiment, implementing the data request may include writing the data to a data cartridge (e.g., a tape cartridge, etc.), utilizing the streaming mode. For example, implementing a data write at the storage drive utilizing the streaming mode may include writing the data to a data cartridge at the storage drive without stopping due to errors. In another example, implementing a data write at the storage drive utilizing the streaming mode may include performing a read-while-write process at the storage drive during the data write. For instance, the read-while-write process reads data on the data cartridge immediately after it is written in order to determine any errors with the written data.

Furthermore, in one example, implementing a data write at the storage drive utilizing the streaming mode may include performing one or more re-writes at the storage drive that are identified during the read-while-write process. In another example, implementing a data write at the storage drive utilizing the streaming mode may include continuing/completing the data write at the storage drive without performing one or more re-writes identified during the read-while-write process. In yet another example, implementing a data write at the storage drive utilizing the streaming mode may include temporarily disabling the writing process at the storage drive in response to determining that a track-following servo control in the storage drive has lost a lock during the data write. For instance, the data cartridge may still be advanced during the temporary disabling (e.g., the tape cartridge may continue to move during the temporary disabling, etc.).

Further still, in one example, implementing a data write at the storage drive utilizing the streaming mode may include temporarily disabling the writing process at the storage drive in response to determining that a tracking error associated with the data write exceeds a predetermined threshold. For instance, the data cartridge may still be advanced during the temporary disabling (e.g., the tape cartridge may continue to move during the temporary disabling, etc.). In another example, implementing a data write at the storage drive utilizing the streaming mode may include calculating a write quality associated with the data write, and comparing the write quality to a predetermined threshold. For instance, the data write may be aborted in response to determining that the write quality associated with the data write is below the predetermined threshold (e.g., is too low for successful retrieval of data from the data cartridge, etc.).

Also, method 800 may proceed with operation 806, where a confirmation is returned by the storage drive to the host, in response to implementing the data request at the storage drive utilizing the streaming mode. In one embodiment, the confirmation may include all or a portion of the data requested to be read. For example, the data request may include a data read request, and implementing a data read at the storage drive utilizing the streaming mode may result in an entirety of the data being read and ECC decoded successfully. In another example, the data request may include a data read request, and implementing a data read at the storage drive utilizing the streaming mode may result in only a portion of the data being read and ECC decoded successfully. In yet another example, only the data that has been read and ECC decoded successfully may be returned by the storage drive to the host in response to the data request.

Additionally, in one embodiment, the confirmation may include one or more identifiers for portions of data that could not be read successfully. For example, the confirmation may include an indication that only a portion of the data could be read successfully. In another example, the confirmation may include one or more error and/or erasure pointers for portions of data that could not be read successfully during the reading of the data from a data cartridge by the storage drive.

Further, in one embodiment, the confirmation may include a summary of the results of implementing the data request at the storage drive utilizing the streaming mode. For example, more detailed information (e.g., full ECC decoding information, etc.) may be stored at the storage drive or another device, and may be made available to a host in response to a request. In another embodiment, the confirmation may include an indication that one or more errors have been encountered by the storage drive, as well as data read before and/or after the one or more errors have been encountered. In another embodiment, the confirmation may include an indication that one or more errors have been encountered by the storage drive, as well as a confirmation of data written before and/or after the one or more errors have been encountered. In yet another embodiment, the confirmation may include only an indication that one or more errors have been encountered by the storage drive.

Further still, in one embodiment, in response to receiving the confirmation, the host may perform one or more actions. For example, the host may issue a retry of the data request to the storage drive (e.g., by sending another data request to the storage drive). For instance, the host may identify a priority associated with the data request, and may schedule the retry of the data request according to the priority. In another example, the host may use a system level ECC (e.g., erasure coding, etc.) to reconstruct any missing data indicated by the storage drive. In yet another example, the host may retrieve missing data from one or more other nodes within a system.

In this way, data correction/recovery may be partially offloaded from the storage drive to the host, which may improve a performance of the storage drive. More specifically, a data read and/or write performance of the storage drive may be improved, and a latency associated with returning the data from the storage drive to the host may be reduced, since the storage drive does not have to be concerned with optimizing a quality of the returned data. Additionally, a flexibility of the storage drive may be enhanced, such that the storage drive itself may perform error correcting during data reading and/or writing, or the storage drive may partially offload error correcting to a host/system level in order to improve a data read and/or write speed by the storage drive.

Further, more data may be stored on a data cartridge by the storage drive, since error correction data (e.g., ECC data, etc.) may not be written by the storage drive to the data cartridge while in the streaming mode. Further, more data may be stored on a data cartridge by the storage drive, since less error correction data (e.g., ECC data, etc.) using a weaker ECC may be written by the storage drive to the data cartridge while in the streaming mode.

In one embodiment, a tape drive operating mode may be implemented where read and write requests are executed in a low latency, limited effort reliability mode. In one embodiment, read and write operations may be carried out in a streaming mode, i.e. in a single pass without stopping or back-hitching. Data detection and decoding is executed "online" in streaming mode—e.g., the data detection and decoding have to keep up with the tape transport speed. If chunks of data cannot be successfully detected/decoded "online," no additional attempts are made, but the (potentially incomplete) data is passed to the host, together with status information about data chunks that could not be retrieved or contain errors.

Current linear magnetic tape drives write data to/retrieve data from tape with maximum effort reliability. For example, a data read request is handled as follows: If data detection and ECC decoding is not successful during the first read attempt, the drive stops due to the error(s), rewinds and tries again (a.k.a. back-hitching). If these retries still fail, the drive explores additional options to recover the data (such as e.g. reduced tape speed, offline ECC post-processing, and other ERP modes). If all options fail, the request fails and the drive declares a Permanent Error and stops. This scheme may suffer from (potentially) large latencies.

For certain implementations (e.g., cloud storage, etc.), such a high and/or variable read latency is undesirable. Therefore, in one embodiment, a streaming mode tape drive: seeks to the location on tape where the data of interest is located, and reads the stored data in a streaming mode (in a single attempt, without back-hitches and without stopping due to errors) at a specified tape speed. The streaming mode tape drive uses limited effort reliability, (e.g., it applies advanced data detection and iterative ECC decoding in a streaming mode, with a guaranteed short latency, but successful data decoding/retrieval is not always guaranteed).

The data that is successfully retrieved from tape (e.g., that is successfully ECC decoded within the guaranteed latency limit) is passed to the host, along with one or more error/erasure pointers for chunks of data that could not be retrieved successfully (e.g., if the request is only partially fulfilled, etc.).

In another embodiment, a similar approach may be implemented for write requests: a tape writes in a streaming mode without stopping, and write quality is monitored by means of a read-while-write process, where re-writes may (or may not) be used to correct for errors, but the writing process does not stop except for some emergency cases. These emergency cases may include: a write being temporarily disabled (with the tape itself still moving) if a track-following servo control loses a lock, or if a tracking error is too large, and a write aborting if the write quality is too low for successful retrieval of data.

Additionally, in one embodiment, partially fulfilled requests, (e.g., when not all data chunks could be successfully retrieved in streaming mode) may be handled on the host/system side. For example, the host/system can issue a retry (e.g., send another read request to the drive, etc.), or use system level ECC (e.g. erasure coding, etc.) to reconstruct a missing chunk of data, or may retrieve missing data from one or more other nodes within a system.

Synchronous Host-Data to Tape Format Mapping

Figure 9:
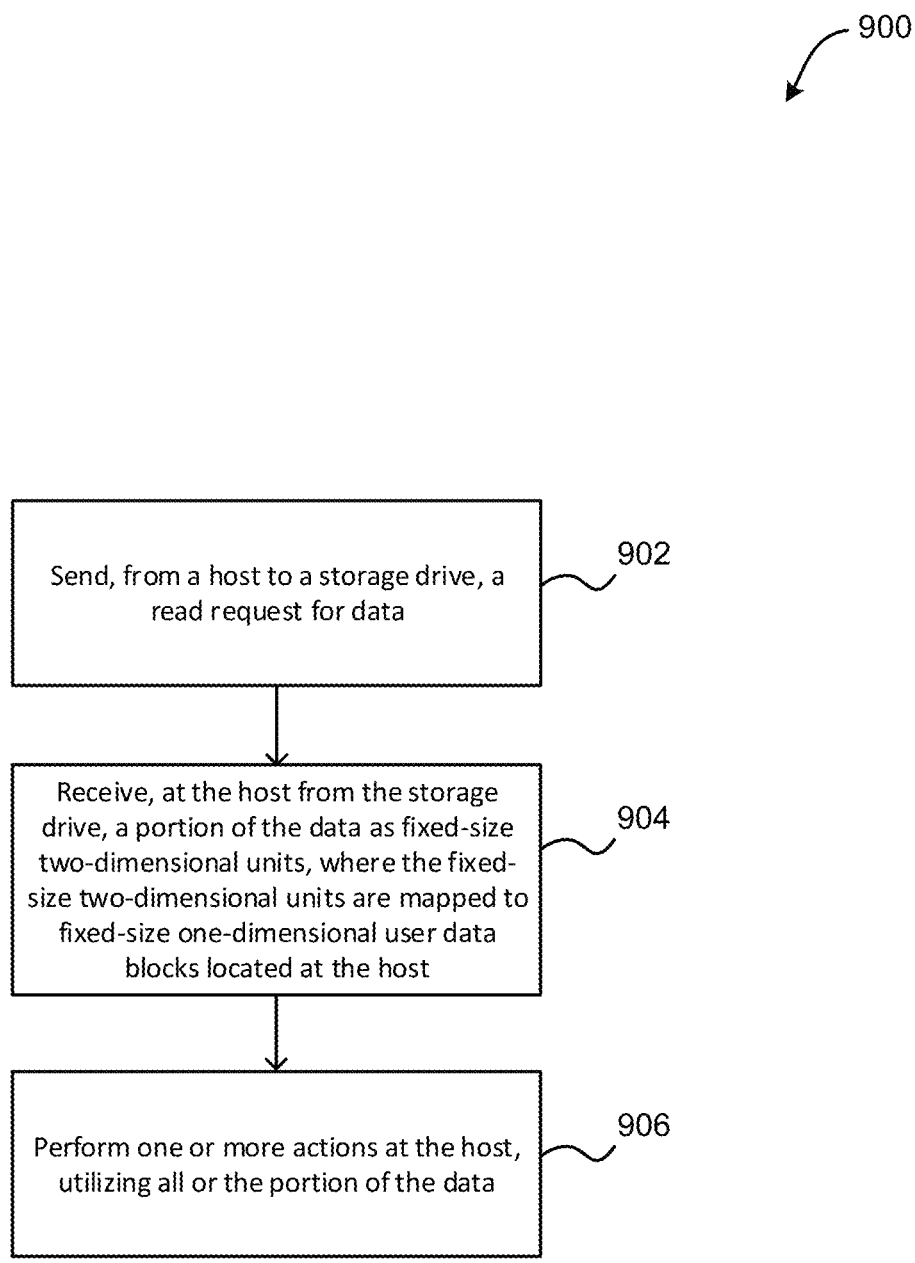
FIG. 9 illustrates a flowchart of a method for implementing a mapping between data at a storage drive and data blocks at a host, in accordance with one embodiment.

Now referring to FIG. 9, a flowchart of a method 900 for implementing a mapping between data at a storage drive and data blocks at a host is shown according to one embodiment. The method 900 may be performed in accordance with the present invention in any of the environments depicted in FIGS. 1-4, 7, and 10 among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where a read request for data is sent from a host to a storage drive. In one embodiment, the storage drive may include a tape drive. In another embodiment, the data to be read may be stored on a data cartridge (e.g., a tape cartridge, etc.) accessible by the storage drive.

Additionally, method 900 may proceed with operation 904, where a portion of the data is received at the host from the storage drive as fixed-size two-dimensional units, where the fixed-size two-dimensional units are mapped to fixed-size one-dimensional user data blocks located at the host. In one embodiment, only a portion of the data requested in the read request may be successfully read and returned by the storage drive to the host. For example, the storage drive may indicate to the host that an error has occurred and that only a portion of the requested data could be returned. In another example, the storage drive may include error status information and/or error pointers.

Further, in one embodiment, a first integer number of the fixed-size two-dimensional units may be mapped to a second integer number of fixed-size one-dimensional user data blocks located at the host, where the first integer number and the second integer number are both greater than or equal to one. In another embodiment, the fixed-size two-dimensional units may be in a logical format (e.g., a logical tape format, etc.). For example, the fixed-size two-dimensional units in the logical format may a variable physical size of data stored on the data cartridge. In another example, the data cartridge may be inserted into the storage drive, read by the storage drive, etc.

Further still, in one embodiment, each of the fixed-size two-dimensional units may include a portion of a data set or sub-data set. For example, each of the fixed-size two-dimensional units may indicate a logical location within a multi-track tape cartridge. In another embodiment, each of the fixed-size two-dimensional units may include a portion of an ECC product codeword. In yet another embodiment, one or more of the fixed-size two-dimensional units may be used for housekeeping data or to enhance error correction (e.g., utilizing an ECC<etc.).

Also, in one embodiment, each of the fixed-size two-dimensional units may be aligned and synchronous with the fixed-size one-dimensional user data blocks located at the host. In another embodiment, each of the fixed-size one-dimensional user data blocks located at the host may be protected by a cyclic redundancy check (CRC) code. In yet another embodiment, padding of the fixed-size one-dimensional user data blocks may be performed at the host in order to implement the mapping. In still another embodiment, a fixed offset scheme may be used where each one-dimensional user data block within the dataset is at some calculable offset, and the block data does not rely on information/context from prior blocks.

In addition, method 900 may proceed with operation 906, where one or more actions are performed at the host, utilizing all or the portion of the data. In one embodiment, performing the one or more actions may include performing ECC decoding on each of the fixed-size two-dimensional units, utilizing the mapping between the fixed-size two-dimensional units and the fixed-size one-dimensional user data blocks located at the host. In another embodiment, performing the one or more actions may include performing compression on each of the fixed-size two-dimensional units, utilizing the mapping between the fixed-size two-dimensional units and the fixed-size one-dimensional user data blocks located at the host.

Furthermore, in one embodiment, performing the one or more actions may include performing encryption on each of the fixed-size two-dimensional units, utilizing the mapping between the fixed-size two-dimensional units and the fixed-size one-dimensional user data blocks located at the host. In another embodiment, performing the one or more actions may include requesting and receiving, by the host, additional data from the storage drive. For example, the additional data may be located within the storage drive at a location beyond data that was unsuccessfully read by the storage drive in response to the original read request for data.

In this way, boundary alignment and synchronicity may be guaranteed between the fixed-size two-dimensional units located at the storage drive and the fixed-size one-dimensional user data blocks located at the host. Additionally, the host may be able to decode (e.g., ECC decode, etc.) a portion of requested data when the entirety of the requested data is not returned by the storage device in response to the read request. Further, the host may be able to request and successfully access and decode additional data after read errors occur at the storage drive. Further still, the mapping may eliminate a need for performing stream parsing by the host when retrieving records from the storage drive.

Additionally, within a logical recorded element (e.g., a tape dataset), a predictable and fixed mapping relationship may be maintained between the host logical record elements and the larger dataset. This includes some degree of processing independence, via alignment with respect to the ECC structures. This differs from modern tape formats which have a strictly sequential encoding of data within the dataset (e.g., where record delimiters/metadata and compression spans multiple records that is not related to the ECC structures, so perfect/complete ECC correction is required to decode the dataset/records). As a result, in today's encoding, if there is any loss within the dataset, either the entire dataset or all the rest of the data beyond the bit lost is inaccessible/unreliable (the decoding stream is unpredictably corrupted until the access point of the next dataset). The mapping makes the records much more independent within the dataset, so if parts of the dataset have bad ECC, more parts (e.g., other records in that dataset, etc.) can still be processed.

Figure 10:
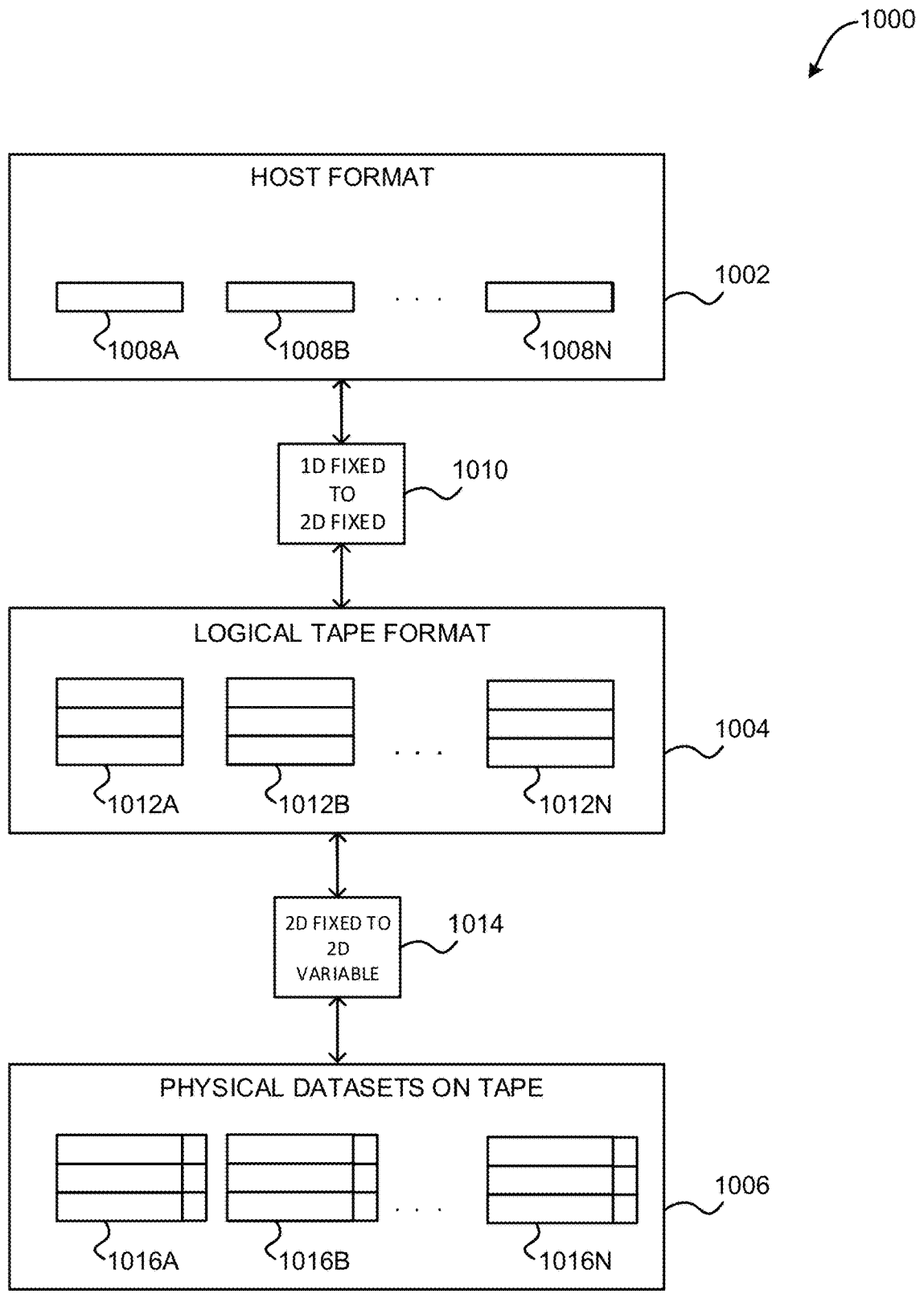
FIG. 10 illustrates an exemplary mapping overview between a host format and a logical tape format, in accordance with one embodiment.

FIG. 10 illustrates an exemplary mapping overview 1000 between a host format 1002 and a logical tape format 1004, according to one exemplary embodiment. As shown, a host format 1002 includes an integer number n1 fixed-size one-dimensional host user data blocks 1008A-N. In one embodiment, each of the host user data blocks 1008A-N may be protected by a CRC code to confirm data integrity.

Additionally, the n1 fixed-size one-dimensional host user data blocks 1008A-N have a synchronous mapping 1010 to an integer number n2 fixed-size two-dimensional logical tape data blocks 1012A-N in a logical tape format 1004. For example, each of the logical tape data blocks 1012A-N may be two-dimensional to account for multiple tracks within tape storage. This synchronous mapping 1010 may guarantee boundary alignment and synchronicity between the host format 1002 used at a host device and the logical tape format 1004 used at the storage drive.

Further, the n2 fixed-size two-dimensional logical tape data blocks 1012A-N have a fixed-to-variable mapping 1014 to variable-sized datasets 1016A-N as implemented on tape 1006. In one embodiment, the variable-sized datasets 1016A-N may result from the need to perform rewrites on data while writing the data to tape.

In this way, if one or more logical tape data blocks 1012A-N are lost (e.g., during a streaming mode/limited effort data read by the storage drive, etc.) and not returned to the host, the host may continue to accept remaining logical tape data blocks 1012A-N from the storage drive without having to re-synchronize a data stream from the storage drive to the host, since such blocks have a synchronous mapping 1010 to host user data blocks 1008A-N.

The storage drive may also be able to inform the host as to which specific logical tape data blocks 1012A-N could not be retrieved, which the host uses to identify corresponding host user data blocks 1008A-N, utilizing the mapping 1010. This may result in an improved status feedback from the storage drive to the host, and may maximize an amount of valid data that is returned from the storage drive to the host when one or more errors are encountered during a data read at the storage drive in response to a read request from the host.

In one embodiment, linear magnetic tape drives accept variable size host data "records" and map them to a variable number of fixed logical size datasets (DS) on tape. The physical size of datasets on tape is variable due to rewrites. As a consequence, the boundaries of the variable size host records versus the fixed size logical tape datasets are non-aligned and asynchronous, and therefore retrieval of records from tape is complicated and requires stream parsing. If a DS cannot be retrieved successfully, records located on the tape beyond the DS content may be lost.

To enable a streaming mode/"limited effort" tape drive, where a read request may be partially fulfilled, a new synchronous mapping of an integer number of n1, n1≥1, fixed-size 1D host user data blocks that may be protected by a cyclic redundancy check (CRC) code to an integer number of n2, n2≥1, fixed-size 2D (multi-track) logical tape format may be implemented, which guarantees boundary alignment and synchronicity. To achieve synchronous mapping or data alignment, padding of data at the host side may be used. The synchronous mapping (boundary alignment) may reduce the amount of data lost as a result of a tape drive not being able to read one or more data sets written on tape.

In standard linear magnetic tape drives, variable size host data "records" are mapped to fixed logical size datasets (DS) on tape. The physical size of datasets on tape is variable due to rewrites. Additionally, boundaries of host records when compared to tape datasets are non-aligned and asynchronous. Further, retrieval of records from tape may be complicated, and may require stream parsing. Further still, if a DS cannot be retrieved successfully, even records beyond the DS content may be lost.

In response, in order to enable a streaming mode/"limited effort" operating mode, a synchronous mapping may be made between an integer number of n1, n1≥1, fixed-size 1D host user data blocks to an integer number of n2, n2≥1, fixed-size 2D (multi-track) logical tape format units of (sub)datasets or product codewords. In this way, each unit can be ECC decoded even if other units cannot. Further, retrieved user data blocks may be passed to the host if successfully decoded, otherwise error status information and/or error pointers may be passed back to host.

Additionally, fixed-size host blocks may therefore be implemented, where such blocks are aligned and synchronous with the logical tape format. Further, compression and encryption may be handled at the host. Further still, host blocks may be protected by a CRC code to make them "protected blocks."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
sending, from a host to a storage drive, a read request for data;
receiving, at the host from the storage drive, a first portion of the data as fixed-size two-dimensional units, where a second portion of the data is not successfully received at the host from the storage drive, and where the fixed-size two-dimensional units are mapped to fixed-size one-dimensional user data blocks located at the host using a synchronous mapping; and
performing error correction code (ECC) decoding on each of the fixed-size two-dimensional units of the first portion of the data, utilizing the synchronous mapping.

2. The computer-implemented method of claim 1, wherein a first integer number of the fixed-size two-dimensional units are mapped to a second integer number of the fixed-size one-dimensional user data blocks located at the host, where the first integer number and the second integer number are both greater than or equal to one.

3. The computer-implemented method of claim 1, wherein each of the fixed-size two-dimensional units are aligned and synchronous with the fixed-size one-dimensional user data blocks located at the host.

4. The computer-implemented method of claim 1, wherein:
the host receives an indication from the storage drive that an error has occurred and that only the first portion of the data could be returned,
each fixed-size two-dimensional unit corresponds to a logical tape data block at the storage drive,
each fixed-size one-dimensional user data block corresponds to a host user data block at the host,
the indication includes error status information and error pointers that identify specific logical tape data blocks of the storage drive that could not be retrieved, and
the host uses the identification of the specific logical tape data blocks of the storage drive that could not be retrieved to identify corresponding host user data blocks at the host, utilizing the synchronous mapping.

5. The computer-implemented method of claim 1, wherein performing the ECC decoding allows the host to decode the data when an entirety of the data is not returned to the host by the storage drive.

6. The computer-implemented method of claim 1, wherein each of the fixed-size one-dimensional user data blocks located at the host are protected by a cyclic redundancy check (CRC) code.

7. The computer-implemented method of claim 1, wherein one or more of the fixed-size two-dimensional units are used for housekeeping data or to enhance error correction.

8. The computer-implemented method of claim 1, wherein padding of the fixed-size one-dimensional user data blocks is performed at the host in order to implement the synchronous mapping.

9. The computer-implemented method of claim 1, wherein:
the second portion of the data is unsuccessfully read by the storage drive in response to the read request for data, and
the host further requests and receives additional data from the storage drive, where the additional data is located within the storage drive at a location beyond the second portion of the data that was unsuccessfully read by the storage drive.

10. The computer-implemented method of claim 1, wherein each of the fixed-size two-dimensional units may include a portion of a product codeword.

11. A computer program product for implementing a mapping between data at a storage drive and data blocks at a host, the computer program product comprising a computer readable storage medium having program instructions embodied therewith, wherein the computer readable storage medium is not a transitory signal per se, the program instructions executable by a processor to cause the processor to perform a method comprising:
sending, by the processor from a host to a storage drive, a read request for data;
receiving, by the processor at the host from the storage drive, a first portion of the data as fixed-size two-dimensional units, where a second portion of the data is not successfully received at the host from the storage drive, and where the fixed-size two-dimensional units are mapped to fixed-size one-dimensional user data blocks located at the host using a synchronous mapping; and
performing, by the processor, error correction code (ECC) decoding on each of the fixed-size two-dimensional units of the first portion of the data, utilizing the synchronous mapping.

12. The computer program product of claim 11, wherein a first integer number of the fixed-size two-dimensional units are mapped to a second integer number of the fixed-size one-dimensional user data blocks located at the host, where the first integer number and the second integer number are both greater than or equal to one.

13. The computer program product of claim 11, wherein each of the fixed-size two-dimensional units are aligned and synchronous with the fixed-size one-dimensional user data blocks located at the host.

14. The computer program product of claim 11, wherein the host receives an indication from the storage drive that an error has occurred and that only the first portion of the data could be returned, where the indication includes error status information and error pointers that identify specific fixed-size two dimensional units of the second portion of the data.

15. The computer program product of claim 11, wherein performing the ECC decoding allows the host to decode the data when an entirety of the data is not returned to the host by the storage drive.

16. The computer program product of claim 11, wherein each of the fixed-size one-dimensional user data blocks located at the host are protected by a cyclic redundancy check (CRC) code.

17. The computer program product of claim 11, wherein one or more of the fixed-size two-dimensional units are used for housekeeping data or to enhance error correction.

18. The computer program product of claim 11, wherein padding of the fixed-size one-dimensional user data blocks is performed at the host in order to implement the mapping.

19. The computer program product of claim 11, wherein:
the second portion of the data is unsuccessfully read by the storage drive in response to the read request for data, and
the host further requests and receives additional data from the storage drive, where the additional data is located within the storage drive at a location beyond the second portion of the data that was unsuccessfully read by the storage drive.

20. A system, comprising:
a processor; and
logic integrated with the processor, executable by the processor, or integrated with and executable by the processor, the logic being configured to:
send, from a host to a storage drive, a read request for data;
receive, at the host from the storage drive, a first portion of the data as fixed-size two-dimensional units, where a second portion of the data is not successfully received at the host from the storage drive, and where the fixed-size two-dimensional units are mapped to fixed-size one-dimensional user data blocks located at the host using a synchronous mapping; and
perform error correction code (ECC) decoding on each of the fixed-size two-dimensional units of the first portion of the data, utilizing the synchronous mapping.

* * * * *